United States Patent
Bromberg

[19]

[11] Patent Number: 6,129,388
[45] Date of Patent: Oct. 10, 2000

[54] SLIDE CHART WITH SLIDE-STOP FLAPS

[75] Inventor: Howard M. Bromberg, Riverdale, N.Y.

[73] Assignee: The Flexi/Group, Inc., Riverdale, N.Y.

[21] Appl. No.: 09/289,529

[22] Filed: Apr. 9, 1999

[51] Int. Cl.[7] .................................................. B42D 15/00
[52] U.S. Cl. .......................... 283/65; 283/66.1; 283/115; 235/70 R; 493/325; 493/355
[58] Field of Search ............................ 283/65, 66.1, 115; 235/70 R; 493/325, 355

[56] References Cited

U.S. PATENT DOCUMENTS

| | | | |
|---|---|---|---|
| 4,262,939 | 4/1981 | Schoettle, Jr. ........................... | 283/65 |
| 4,520,749 | 6/1985 | Jefferson ................................. | 116/325 |
| 4,913,694 | 4/1990 | Alphenaar et al. ..................... | 493/356 |
| 5,454,599 | 10/1995 | Totz et al. .............................. | 283/67 |
| 5,458,377 | 10/1995 | Utz et al. ................................ | 283/65 |

*Primary Examiner*—Willmon Fridie, Jr.
*Assistant Examiner*—Daniel Phan
*Attorney, Agent, or Firm*—Herbert Dubno

[57] ABSTRACT

A slide chart in which the sleeve and the slide have mutually engaging flaps which click past one another upon insertion of the slide into the sleeve but engage to prevent withdrawal of the slide from the sleeve.

13 Claims, 4 Drawing Sheets

SLIDE CHART WITH SLIDE-STOP FLAPS

FIELD OF THE INVENTION

My present invention relates to a slide chart and, more particularly, to a slide chart of the type wherein a slide of sheet material is displaceable within a sleeve of sheet material so that indicia on the slide can be viewed through at least one window in the sleeve.

BACKGROUND OF THE INVENTION

Slide charts composed of a sheet material, e.g. paper, paperboard, cardboard and the like are widely used as promotional items and as accessories in many commercial fields to facilitate calculation, permit a user to make a selection, to display indicia relating to a variety of categories of things, or in general, to simplify relationships between different items.

For example, a slide chart may display weight relationships, allow for the termination of calory contents of various comestibles, demonstrate how devices are to be used, show historical facts or enable mathematical calculations associated with goods or independently of such associations. For that purpose, the sleeve is provided with one or more windows, usually at least two windows, in which indicia carried by the slide can be displayed, the indicia changing as the slide is moved to a greater degree into the sleeve or is pulled to a greater degree out of the sleeve via a portion of the slide which remains projecting from an open end of the sleeve after the slide has been inserted.

In many cases it is desirable that the slide not be capable of being withdrawn from the sleeve after it has been inserted upon assembly and, to that end, there has been no truly simple and convenient stop system available heretofore which is reliable and can economically be incorporated into such a slide chart. The slide chart itself is intended to be inexpensive and is usually composed of paper, paperboard and cardboard which is easily die cut and folded to form the sleeve with the window and which can be easily printed with the indicia. The sleeve or the slide may carry promotional messages or graphics and parts or all of the sheet material can be laminated with plastic foils if desired.

OBJECTS OF THE INVENTION

It is the principal object of the present invention to provide an improved slide chart which eliminates a drawback with respect to earlier slide charts by economically and reliably preventing extraction of a slide inserted into the slide chart sleeve.

Another object of this invention is to provide an improved slide chart which has incorporated therein a stop system for the slide which automatically is effective upon insertion of the slide into the sleeve and yet can reliably prevent withdrawal of the slide from the sleeve.

Another object is to provide for easy and economical insertion of the slide into the sleeve.

SUMMARY OF THE INVENTION

These objects and others which will become apparent hereinafter are attained, in accordance with the invention in a slide chart which comprises:
- a flat sleeve composed of a sheet material and having two broad sides connected together along a pair of longitudinal edges, at least one window formed in at least one of the broad sides, and at least one open end;
- a flat slide of a sheet material insertable into the sleeve and extending out of the open end, or exposed in a thumb notch in the end of the sleeve, the slide having on at least one side thereof indicia viewable through the window; and
- stop means effective upon displacement of the slide for limiting displacement of the slide in the sleeve, the stop means including a sleeve flap on one of the broad sides at an inside of the sleeve extending in one direction and a slide flap on the slide extending in an opposite direction and engageable with the sleeve flap.

Preferably the stop means is effective to prevent withdrawal of the slide from the sleeve in the opposite direction following insertion of the slide into the sleeve in the one direction, the slide flap being deflected against the slide and the sleeve flap being deflected against the sleeve upon insertion of the slide into the sleeve in the one direction until a free edge of the slide flap clears a free edge of the sleeve flap.

The sleeve flap can be a flap of the sheet material of the sleeve folded out of the window or can be a flap which, when the sleeve blank is die cut from sheet material, is connected by a fold line to a panel of that blank. The slide flap can be connected by a fold to a strip of the sheet material constituting the slide and overlying a side thereof.

Preferably the sleeve is comprised of three panels including a center panel formed with the window, an inner panel folded into the sleeve to be juxtaposed with the center panel and formed with the sleeve flap, and an outer panel folded over the inner panel and connected by an adhesive thereto.

An end panel on the center panel can be folded over this outer panel and adhesively bonded thereto at the end of the sleeve opposite the open end.

According to a further feature of the invention, the sleeve and the slide have respective pairs of flaps engageable upon displacement of the slide in both of the directions through a predetermined distance to block further displacement of the slide in the respective direction.

One of the free edges of one of the flaps can, in accordance with another feature of the invention, be inclined to the direction of movement of the slide for engagement of the flap so as to prevent abutment of these free edges, thereby enabling the two flaps to engage one behind the other.

With the system of the invention, withdrawal of the slide from the sleeve can be effectively prevented once the slide has been inserted and its flap "clicks" behind the sleeve flap.

Of course, windows can be provided on both sides and the sleeve to cooperate with indicia on both sides of the slide and further indicia on the slide can cooperate with an edge of the sleeve where desirable. The arrangement of the indicia and the windows will be such as to convey the desired information and relationships between the groups of information as is known with respect to slide charts. The slide chart of the invention is composed of paper, paperboard or cardboard which may or may not be laminated and the windows may be open or closed by a sheet of transparent material applied to the slider.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
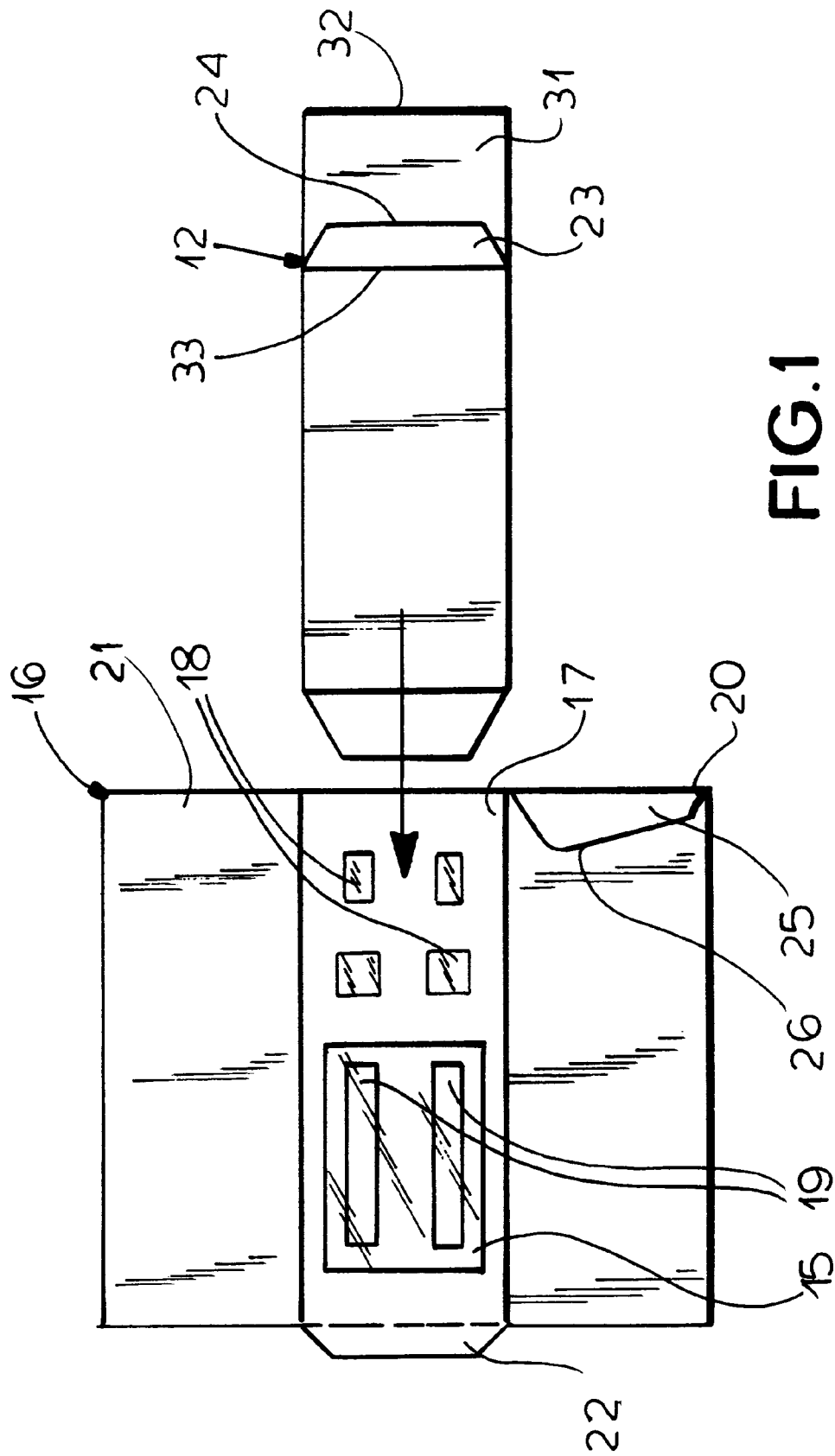
FIG. 1 is an exploded view showing an unfolded sleeve blank and the slider for insertion into the sleeve when it is formed, according to the invention.
Figure 2:
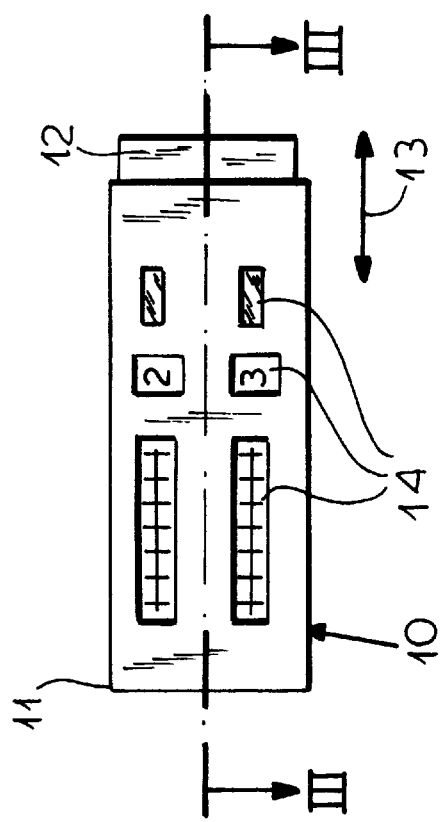
FIG. 2 is an elevational view of the assembled slide chart.

In FIG. 2 I have shown diagrammatically a slide chart 10 which comprises a flat tubular sleeve 11 and a slide 12 receivable in that sleeve and shiftable in the direction of the double-headed arrow 13 back and forth to display various indicia 14 through windows which have been die cut in the sheet material constituting the sleeve. The windows may be throughgoing cut outs or can be covered by a transparent medium, for example, foil 15 shown in FIG. 1. The sleeve 11 can be fabricated from a die cut blank 16 (FIG. 1) which has a center panel 17 formed with the windows 18 and 19 which can be of any convenient shape and are, of course, correlated with indicia on the side of the slide 12 which is visible through these windows.

The center panel 17 can be flanked by an inner panel 20 and an outer panel 21 and can have a flap or end panel 22. To assemble the sleeve, the inner panel 20 is folded over the center panel 17 and the outer panel 21 is folded over and glued to the back side of the inner panel 20, whereupon the end panel 22 can be folded inwardly and glued to the back side of the outer panel 21.

Figure 4:
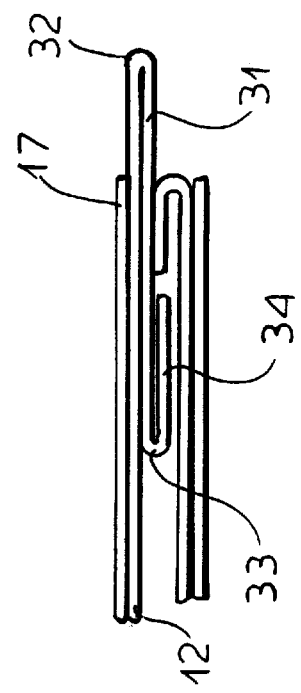
FIG. 4 is a detail in section showing the relationship between the stop flaps before interengagement.
Figure 3:
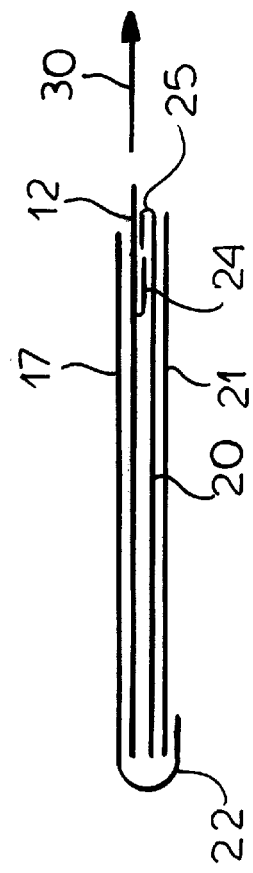
FIG. 3 is a diagrammatic section generally along the line III—III of FIG. 2.

The slider 12 can be formed, as shown in FIG. 1, with a flap 23 having a free edge 24 which, upon insertion of the slider into the sleeve, clicks past an inwardly-turned flap with a free edge 26 so that, when an attempt is made to withdraw the slider 12, the flap 24 will lock behind the flap 25 and prevent such withdrawal. This can be seen diagrammatically in the section of FIG. 3, in which the center panel 17 is the upper panel and has its flap 22 turned under the outer panel 21. The flap 25 of the inner panel 20 is here shown to engage the flap 24 of the slider 12 when the latter is pulled in the direction of arrow 30. This relationship is seen in greater detail in FIG. 4 where the slider 12 is shown to have a strip 31 turned inwardly at its edge 32 and glued to the remainder of the slider 12. The flap 24 is connected by a fold edge 33 to this strip 31.

Figure 5:
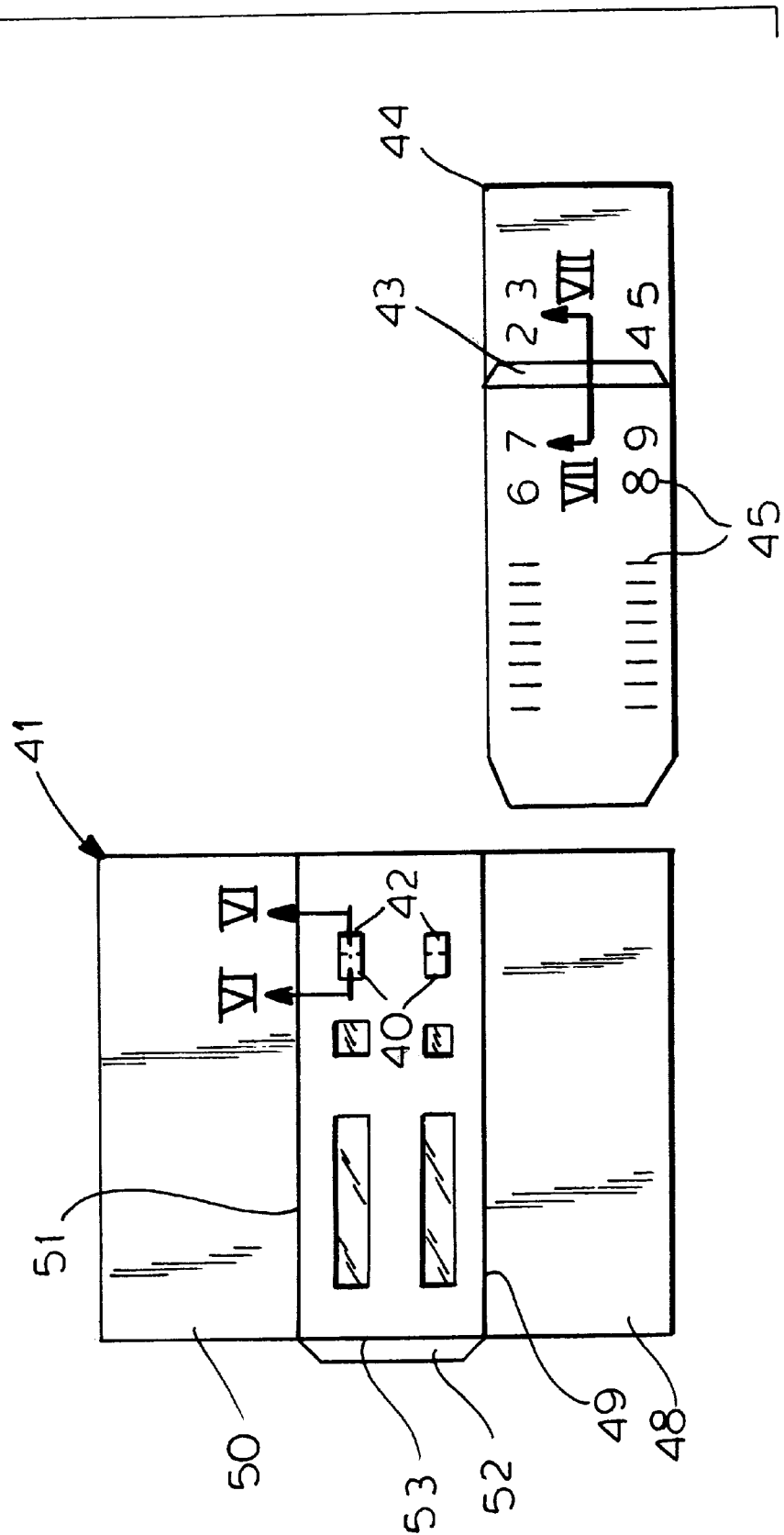
FIG. 5 is a view similar to FIG. 1 illustrating another embodiment.
Figure 6:
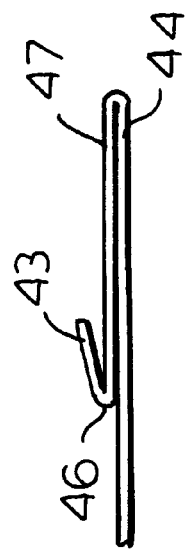
FIG. 6 is a cross sectional view along the line VI—VI of FIG. 5 but with the thickness of the sheet material disproportionally enlarged.
Figure 7:
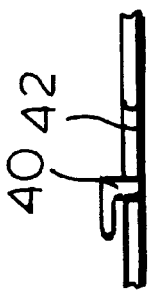
FIG. 7 is a section similar to FIG. 6 taken along the line VII—VII of FIG. 5.

As can be seen from FIG. 5, flaps 40 can be turned inwardly after being die cut from the blank 41 in the formation of the windows 42 and can be engaged by a flap 43 on the slider 44. Here the flap 43 is provided on the side of the slider 44 bearing the indicia 45 and is connected by a fold line 46 to the strip 47 of the slider 44. The blank can be formed into the sleeve by folding the inner panel 48 along the fold line 49 on the outer panel 50 along the fold line 51 gluing the outer panel 50 onto the back side of the inner panel 48. The end panel 52 can then be folded inwardly along the fold line 53 and can be glued to the back side of the panel 50.

In this embodiment as well, the interengagement of the flaps on the slide and on the sleeve prevents withdrawal of the sleeve after the slide has been inserted so that its flap 43 passes the flaps 40.

As shown in FIG. 1 at 26, at least one of the leading edges of one of the flaps can be cut at a bias to the direction of movement of the slide to prevent the free edges of the flaps from hanging up on one another.

Figure 8:
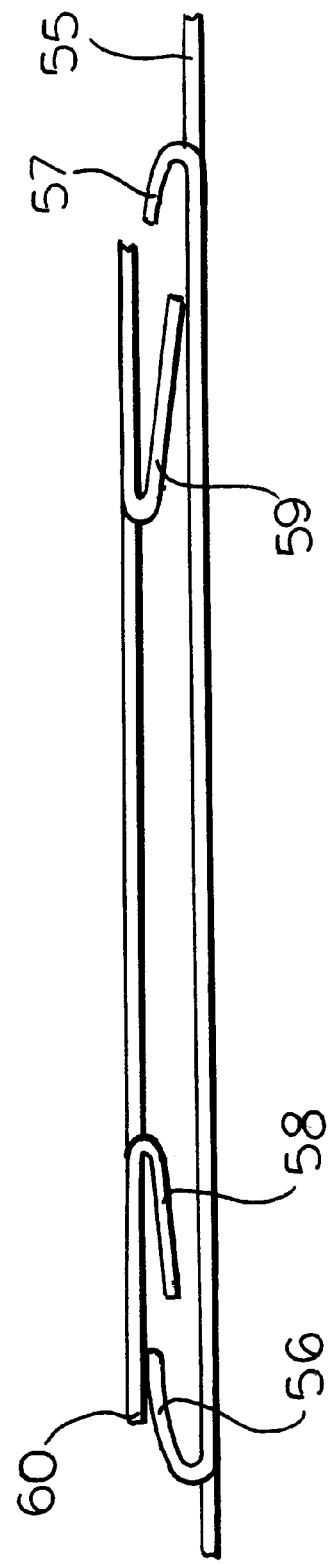
FIG. 8 is another view in which thicknesses have been disproportionally enlarged showing a slide chart in which stop means effective in both directions of displacement of the slider have been provided.

The slide 55 in FIG. 8 may have flaps 56 and 57 engageable with flaps 58 and 59 of one of the panels 60 of the sleeve so that after a limited movement of the slider in the sleeve in both directions, the pairs of flaps will engage to prevent further displacement.

The sleeve and the slide can be composed of any sheet material with sufficient rigidity, for example, paper, paperboard or cardboard or rigid plastic which can have a plastic foil laminated to it as desired or can be coated with a material contributing body or stiffening to the sheet.

I claim:

1. A slide chart comprising:
   a flat sleeve composed of a sheet material and having two broad sides connected together along a pair of longitudinal edges, at least one window formed in at least one of said broad sides, and at least one open end;
   a flat slide of a sheet material insertable into said sleeve and extending out of said open end of said sleeve, or visible in a thumb notch on an end of said sleeve having on at least one side thereof indicia viewable through said window; and
   stop means effective upon displacement of said slide for limiting displacement of said slide in said sleeve, said stop means including a free sleeve flap within said sleeve on one of said broad sides at an inside of said sleeve extending in one direction away from said open end and a free slide flap on said slide within said sleeve extending in an opposite direction and engageable with said sleeve flap.

2. The slide chart defined in claim 1 wherein said stop means is effective to prevent withdrawal of said slide from said sleeve in said opposite direction following insertion of said slide into said sleeve in said one direction, said slide flap being deflected against said slide and said sleeve flap being deflected against said sleeve upon insertion of said slide into said sleeve in said one direction until a free edge of said slide flap clears a free edge of said sleeve flap.

3. The slide chart defined in claim 1 wherein said sleeve flap is a flap of said sheet material of said sleeve folded out of said window.

4. The slide chart defined in claim 1 wherein said sleeve flap is an inwardly folded flap on said sleeve at said open end.

5. The slide chart defined in claim 1 wherein said slide flap is connected by a fold to a strip of the sheet material of said slide overlying a side thereof.

6. The slide chart defined in claim 1 wherein said sleeve is comprised of three panels including a center panel formed with said window, an inner panel folded into said sleeve to be juxtaposed with said center panel and formed with said sleeve flap, and an outer panel folded over said inner panel and connected by an adhesive thereto.

7. A slide chart comprising:
   a flat sleeve composed of a sheet material and having two broad sides connected together along a pair of longitudinal edges, at least one window formed in at least one of said broad sides, and at least one open end;
   a flat slide of a sheet material insertable into said sleeve and extending out of said open end of said sleeve, or visible in a thumb notch on an end of said sleeve having on at least one side thereof indicia viewable through said window; and stop means effective upon displacement of said slide for limiting displacement of said slide in said sleeve, said stop means including a sleeve flap on one of said broad sides at an inside of said sleeve extending in one direction and a slide flap on said slide extending in an opposite direction and engageable with said sleeve flap, said sleeve being comprised of panels including a center panel formed with said window, an inner panel folded into said sleeve to be juxtaposed with said center panel and formed with said sleeve flap, an outer panel folded over said inner panel and connected by an adhesive thereto, and an end panel on said center panel folded over said outer panel and adhesively bonded thereto at an end of said sleeve opposite said open end.

8. The slide chart defined in claim 7 wherein said stop means is effective to prevent withdrawal of said slide from said sleeve in said opposite direction following insertion of said slide into said sleeve in said one direction, said slide flap being deflected against said slide and said sleeve flap being deflected against said sleeve upon insertion of said slide into said sleeve in said one direction until a free edge of said slide flap clears a free edge of said sleeve flap.

9. The slide chart defined in claim 8 wherein said sleeve flap is a flap of said sheet material of said sleeve folded out of said window.

10. The slide chart defined in claim 9 wherein said sleeve flap is an inwardly folded flap on said sleeve at said open end.

11. The slide chart defined in claim 10 wherein said slide flap is connected by a fold to a strip of the sheet material of said slide overlying a side thereof.

12. The slide chart defined in claim 1 wherein said sleeve and said slide have respective pair of flaps engageable upon displacement of said slide in both of said directions through a predetermined distance to block further displacement of the slide in the respective direction.

13. A slide chart comprising:

a flat sleeve composed of a sheet material and having two broad sides connected together along a pair of longitudinal edges, at least one window formed in at least one of said broad sides, and at least one open end;

a flat slide of a sheet material insertable into said sleeve and extending out of said open end of said sleeve, or visible in a thumb notch on an end of said sleeve having on at least one side thereof indicia viewable through said window; and stop means effective upon displacement of said slide for limiting displacement of said slide in said sleeve, said stop means including a sleeve flay on one of said broad sides at an inside of said sleeve extending in one direction and a slide flap on said slide extending in an opposite direction and engageable with said sleeve flap, said stop means being effective to prevent withdrawal of said slide from said sleeve in said opposite direction following insertion of said slide into said sleeve in said one direction, said slide flap being deflected against said slide and said sleeve flap being deflected against said sleeve upon insertion of said slide into said sleeve in said one direction until a free edge of said slide flap clears a free edge of said sleeve flap, one of said free edges being inclined to said directions to prevent abutment of said free edges with one another upon displacement of said slide in said opposite direction.

\* \* \* \* \*